Dec. 15, 1931.  S. F. DAVENPORT  1,836,650
LURE
Filed July 3, 1928

Inventor
S. F. Davenport

By
Eccleston & Eccleston,
Attorneys

Patented Dec. 15, 1931                                                    1,836,650

UNITED STATES PATENT OFFICE

SAM F. DAVENPORT, OF AUBURN, INDIANA, ASSIGNOR TO THE CREEK CHUB BAIT CO., OF GARRETT, INDIANA

LURE

Application filed July 3, 1928. Serial No. 290,113.

This invention relates to casting and trolling lures and has for its primary object to provide such a device of simple and inexpensive construction which when drawn through the water will simulate both the appearance and action of a live body such as fish feed upon.

A further object of the invention resides in the provision of an artificial lure which is strong and durable in operation, is practically free from wear, and which lends itself readily to various types of fishing by reason of certain minor alterations to which it is susceptible.

Other objects and advantages of the invention will be apparent from the following description when taken in connection with the accompanying drawings; in which Figure 1 is a perspective view of the complete lure.

Figure 1:
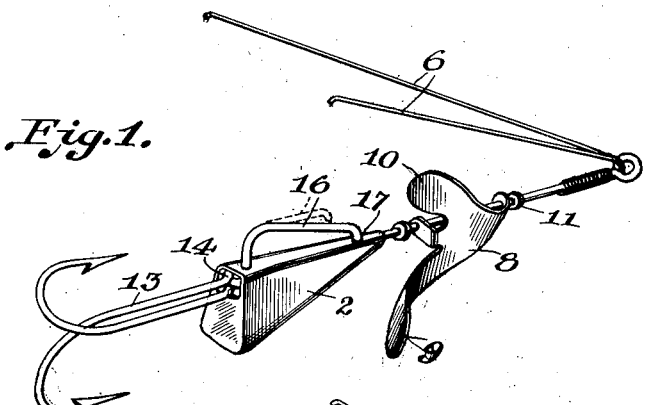

Referring to the drawings more specifically the numeral 1 indicates the lure body which is formed of lead or other metal having a high specific gravity and preferably tapered as shown. Surrounding or encasing the lead weight 1 is a metal casing 2 of brass, copper or other similar metal which is susceptible of a high and lasting finish such as nickel, gold or silver plate, or the like, so as to provide an attractive body portion while at the same time providing the necessary weight with the least expense. This body is preferably formed with its lower edge inclined upwardly toward the straight upper edge so as to provide a substantial portion of the weight thereof below the line of draft, thereby preventing any turning of the body portion of the lure or the hooks carried thereby when the same is being drawn through the water.

Rigidly secured to the body portion 1 is a shank 3 having its inner end provided with a hook portion 4 which is embedded within the body portion 1 at the time it is cast or molded. The opposite end of the shank portion 3 is provided with an eye 5 to which the line is attached and also serves as an anchoring means for weed guards 6, in the event that such guards are desired. These guards 6 have their inner ends passed through the eye 5 and bent down along the body portion of the shank, and the bent ends are firmly secured to the shank by means of windings 7. Also mounted on the shank 3 is a spinner 8 provided with long and short wings 9 and 10 so as to provide an unbalanced structure which will rotate about the shank 3 as an axis and produce a vibratory movement in the lure as it is drawn through the water. Longitudinal movement of the spinner 8 on its shaft 3 is prevented by means of the bead bearings 11.

Figure 2:
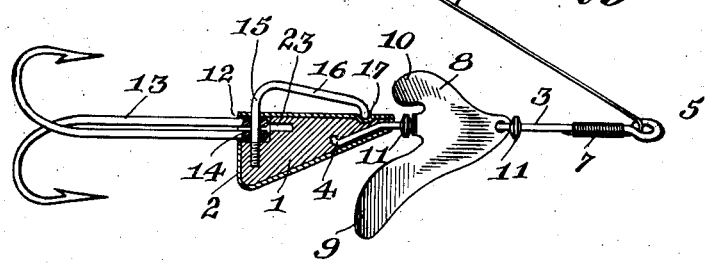
Figure 2 is a longitudinal sectional view through the lure.

For the purpose of securing hooks to the lure body the part 1 thereof is provided with a cavity 12 and the hooks which are indicated by the numeral 13 in Figure 1 are provided with eyes 14 which are adapted to seat within the cavity 12. In order to pivotally secure these hooks in their proper position with respect to the lure body, a threaded L-shaped member 15 is provided which, as indicated in Figure 2, is passed through the eyes of the hooks 13 and is threaded into the body portion 1 of the lure. This member 15 is provided with a resilient extension 16 which has its free end bent downwardly and is adapted to seat within a recess 17 formed in the casing 2 of the lure body when the member 15 is screwed into proper position in the body 1. By this means the member 15 is releasably secured in its hook-engaging position and thereby prevents a loss of the hooks 13.

The extension 16 of the hook-securing means 15 has an additional function in that it serves as an anchoring means for a strip of flexible material or pork rind which it is the usual practice to employ with many types of lures. This pork rind is designated by numeral 18 in Figure 5, and is shown as threaded over the hooked end portion of the extension 16 and moved down onto the threaded member 15. When a strip of pork rind is used it is desirable to have some means to hold the rind extended toward the spear portion of the hook, and in Figures 3 and 5 I have shown such a hook which is designated by the numeral 19 and is provided with a stop 20 located about midway of the length of the shank thereof. The rind is first passed over the point of the hook 19 at some point intermediate the ends of the rind so as to allow one end to be passed over the extension 16 of element 15; it being understood that extension 16 is reversed from its position shown in order to receive the rind, and that when returned to closed position the rind is drawn taut between stop 20 and element 15.

Figure 5:
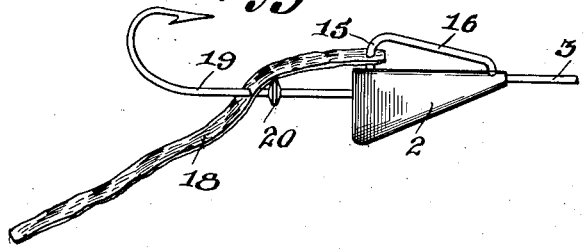
Figure 5 is a side elevation of the lure body with the fish hook of Figure 3 associated therewith.

In the arrangement shown in Figure 5 it is desirable that the hook 19 have a substantially rigid connection with the lure body, and to this end the shank of the hook in addition to the eye 21 is provided with an extension 22. Referring to Fig. 2, it will be noted that the body portion 1 of the lure is provided with a notch 23 and this notch is adapted to receive the extension 22 on hook 19 when such hook is used, and serves to prevent any pivotal movement of the hook 19 about the member 15 by which it is attached to the body 1. Vertical movement of the hook along the member 15 is also prevented by reason of the limited dimensions of the notch 23.

Figure 3:
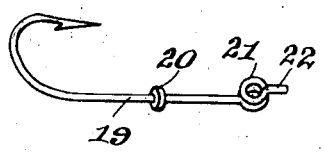
Figures 3 and 4 are perspective views of substitute hooks which may be used with the device of Figures 1 and 2.
Figure 4:
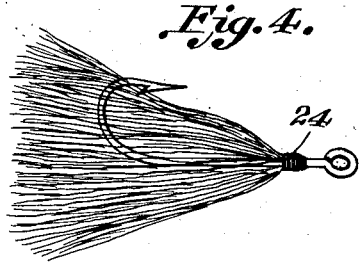

In Figure 4 I have shown another type of hook 24 which is substantially the same as that shown in Figures 1 and 2 except that it is provided with hair, feathers, or the like, to serve as a concealment for the spear portion of the hook. In this type of hook as well as the hooks shown in Figures 1 and 2, the attaching eye is not provided with an extension such as drawn on the hook of Figure 3, and therefore is permitted a pivotal movement limited only by the edges of the casing 2.

In the operation of the lure as shown in Figures 1 and 2, the hooks 13 are positioned with their eyes 14 within the cavity 12 and the fastening means 15 threaded into such position that the hook end of the extension 16 will seat in recess 17 of the casing 2. These hooks 13 are not provided with the extensions 22 and hence are permitted to pivot about the member 15 and to move up and down along this member to a limited extent. As the lure is drawn through the water, the spinner 18, due to the conformation of its wings 9 and 10, will be caused to rotate about the shank portion 3 and this movement, together with the high polish of the spinner, will tend to attract the fish; and furthermore, due to its unbalanced design, will create a certain wiggling action or vibration in the lure in simulation of a live body such as fish usually feed upon.

For certain types of fishing it is desirable to have the hook rigidly connected with respect to the body portion of the lure, and in such instances a hook such as shown in Figure 3 is employed. This hook, by reason of its extension 22 being mounted in the notch 23, is prevented from pivoting about the member 15 and is also locked against vertical movement along this member. Where such a hook is employed as well as in instances where hook 13 is employed, a flexible member such as a piece of pork rind may be combined with the lure by threading one end thereof over the extension 16 of the member 15 as indicated in Figure 5, and the stop 20 which is formed on hook 19 serves to hold this flexible element in a more or less extended position as shown in Figure 5. It will be obvious that this extension 16 provides a very simple and easily operable means for attaching the pork rind in position on the lure. When the flexible element is employed it will be apparent that a substantial wiggling action is created therein by reason of the vibratory movement caused in the body of the lure by the rotative movement of the unbalanced spinner 8.

From the foregoing description taken in connection with the accompanying drawings it will be apparent to those skilled in the art that I have provided a rather simple and inexpensive construction of casting or trolling lure which is highly decorative in appearance; that it is strong and durable in operation and practically free from wear; that it will give a very close simulation of live bait; and that by a very simple adjustment, the lure may be adapted to various types of fishing.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include within the scope of the appended claims.

What I claim as new and desire to secure by Letters Patent is:

1. In a lure, a body portion, a resilient member pivoted to said body portion for securing hooks thereto, and a depression in the body portion for releasably engaging the free end of said member.

2. In a lure, a body portion, a member pivoted to said body portion for securing hooks thereto, a resilient extension on said member, and means on said body portion for cooperation with said resilient extension to releasably lock said member in position.

3. In a lure, a body portion provided in one end with a cavity and an internal notch communicating therewith, a hook, an eye formed on the shank of said hook and provided with an extension, said eye and extension being positioned in said cavity and notch respectively, and means passing through said eye for securing the hook to the body of the lure.

4. In a lure, a body portion, a hook provided with an eye, an L-shaped member having one of its arms passed through said eye and pivotally mounted in said body portion, the other arm of said L-shaped member serving as an anchoring means for a piece of pork rind.

5. In a lure, a body portion, a hook provided with an eye, an L-shaped member having one of its arms passed through said eye and pivotally mounted in said body portion, the other arm of said L-shaped member serving as an anchoring means for a piece of bait, and means on said body portion for cooperation with said last-named arm.

SAM F. DAVENPORT.